April 23, 1968 G. O. CHALK Re. 26,384

ULTRA LOW NOISE TRAVELLING WAVE TUBE HAVING A GRID VOLTAGE ARRANGEMENT THAT INCLUDES A PRE-SET POTENTIOMETER

Original Filed Aug. 26, 1964

INVENTOR

Graeme Oliver Chalk

BY

Baldwin & Wight

ATTORNEYS

United States Patent Office

Re. 26,384
Reissued Apr. 23, 1968

26,384

ULTRA LOW NOISE TRAVELLING WAVE TUBE HAVING A GRID VOLTAGE ARRANGEMENT THAT INCLUDES A PRE-SET POTENTIOMETER

Graeme Oliver Chalk, Chelmsford, England, assignor to English Electric Valve Company Limited, London, England, a British company Original No. 3,293,479, dated Dec. 20, 1966, Ser. No. 392,198, Aug. 26, 1964. Application for reissue Mar. 31, 1967, Ser. No. 637,017

4 Claims. (Cl. 315—3.5)

Matter enclosed in heavy brackets [ ] appears in the original patent but forms no part of this reissue specification; matter printed in italics indicates the additions made by reissue.

This invention relates to travelling wave tube arrangements including travelling wave tubes operated as so-called ultra low noise tubes.

Figure 1:
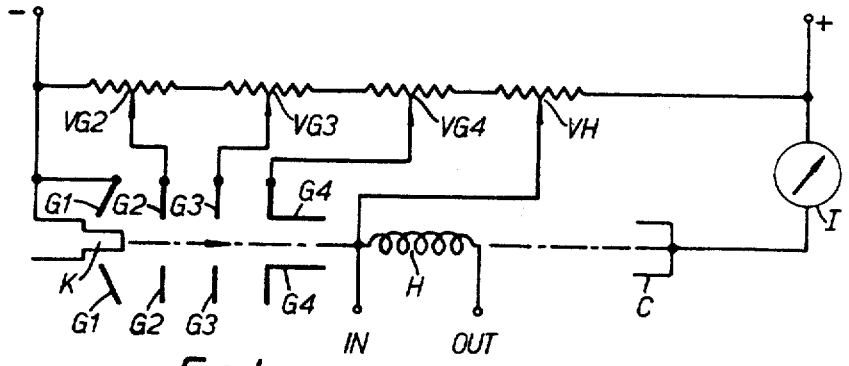
FIG. 1. (PRIOR ART)
Figure 2:
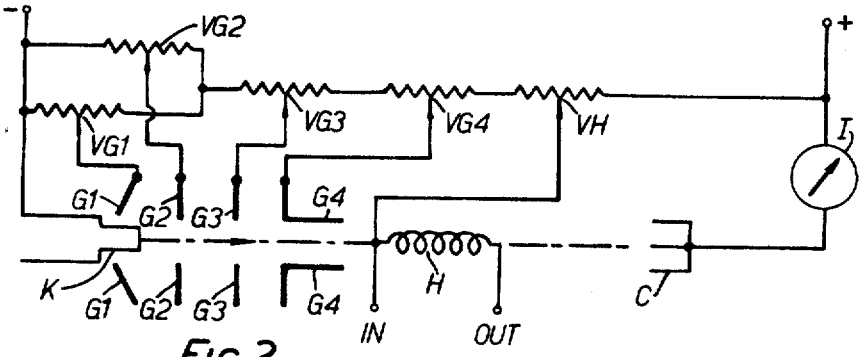
FIG. 2. (PRIOR ART)
Figure 3:
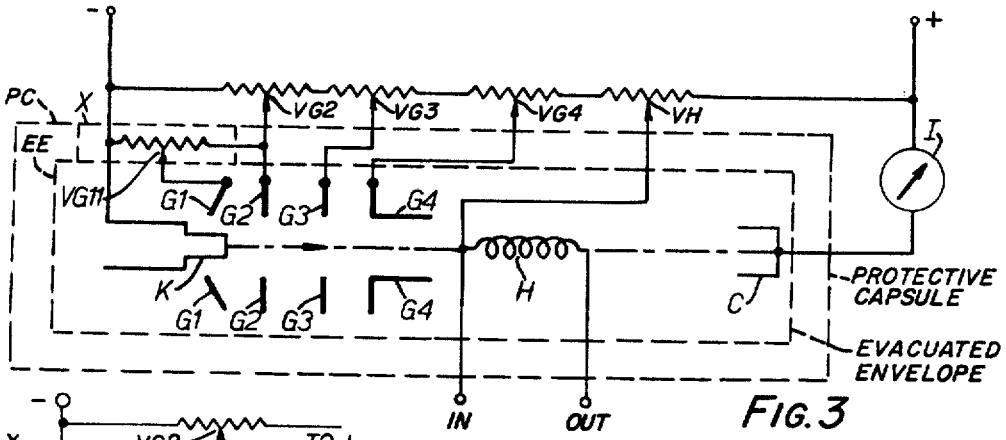
Figure 4:
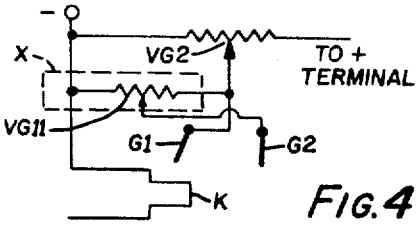

The invention is illustrated in and explained in connection with the attached [accompanying] drawings, in which FIG. 1 diagrammatically illustrates a known conventional travelling wave tube arrangement in which the tube is not operated as an ultra low noise tube; FIG. 2 similarly illustrates a known ultra low noise travelling wave tube arrangement; FIG. 3 illustrates one embodiment of the present invention, and FIG. 4 illustrates another embodiment of the present invention. Like references denote like parts in all the figures.

Referring to FIG. 1, the electrode system of the tube therein employed comprises within an evacuated envelope (not shown) an electron gun including a cathode K and a series of apertured grids G1, G2, G3 and G4; a delay line helix H; and a hollow collector electrode C. Adjustable operating potentials are supplied to the grids (except the first) and to the helix from sliders on a number of resistances connected in series across a D.C. supply source as shown in FIG. 1, in which the sliders from which potentials are applied to the different electrodes are designated by the same reference as those electrodes preceded by the reference letter V. In the case of a conventional low noise tube arrangement with a noise figure of 6 or 7 db *at* frequencies of the order of those of the S-band, the first grid G1 is connected to the cathode and to the negative terminal of the supply (in some cases the first grid G1 may be connected to receive a potential which is slightly negative with respect to cathode potential) and the collector is connected to the positive terminal of the supply. A current meter I is shown in the last connection. Signal input is, of course, applied to one end terminal IN of the helix and output is taken from the other end terminal OUT thereof.

The power gain of the tube in an arrangement as illustrated by FIG. 1 is a function of the helix voltage VH and of the collector current I and the latter is determined mainly by the voltage VG2 on the grid G2. To set up such an arrangmeent for operation with minimum noise; VG2 is adjusted to bring the collector current I to a value specified by the tube manufacturer on the tube data sheet normally supplied with the tube; the radio frequency output of the tube at OUT is brought to a maximum by adjusting VH; and the radio frequency noise at the output is brought to a minimum by adjusting VG3 and VG4. Once I and VH are adjusted to their correct values the gain of the tube is held substantially constant while VG3 and VG4 are adjusted for minimum noise i.e. until minimum radio frequency noise is obtained at the output. Adjustment to minimum noise in this way in fact achieves minimising of the noise figure of the tube i.e. the noise output of the tube at constant gain. The only calibrated instrument required for the adjustment is the current meter I. Adjustments of the tube for optimum operation and minimum noise figure is therefore a comparatively simple matter to carry out in the field away from the tube factory and satisfactory adjustment can be made by relatively unskilled persons.

In an ultra low noise tube arrangement, however, i.e. an arrangement with a noise figure of (say) only 3 or 4 db at S-band frequencies, the first grid G1 is operated at a potential which is positive with respect to the cathode and, in any particular arrangement, a unique combination of positive potentials on the first two grids G1 and G2 is necessary to give the minimum noise figure. Such an arrangement is known as one having a Currie electron gun and, for further information with regard thereto, attention is directed to the Proceedings of the Institution of Radio Engineers, vol. 46, 1958, pages 575 and 911. FIG. 2 shows a typical known ultra low noise tube arrangement of present day practice. It will be seen that the essential differences between FIGURES 1 and 2 is that, in FIG. 2, each of the first two grids G1 and G2 has its own positive potential VG1 or VG2 obtained from similarly referenced potentiometers the resistances of which are in parallel with one another and together in series with the resistances of the potentiometers VG3, VG4, and VH. As above stated there is, for minimum noise figure with any individual tube, a unique combination of the voltages VG1 and VG2—this combination differs a little from tube to tube—although there is, for a given tube, an infinity of combinations which result in the same collector current and therefore in the same gain. The two values for VG1 and VG2 for minimum noise figures can be determined by trial and error in the test laboratory of the factory in which the tube is made and this combination of potentials remains substantially unchanged during the useful life of the tube.

It is possible, therefore, to adjust the arrangement of FIG. 2 in the field by adjusting VG1 and VG2 to predetermined potentials as given in a tube data sheet issued with the tube by the manufacturer; adjusting VH to produce maximum tube output; and adjusting VG3 and VG4 to produce minimum noise output from the tube. This sequence of adjustments requires, however, considerable skill and care to achieve best results. It involves the use of a voltmeter which is calibrated substantially identically with the one used in the factory test laboratory to derive the figures given in the tube data sheet in order that VG1 and VG2 shall be set correctly to the required values, for VG1 and VG2 cannot be independently adjusted to produce minimum noise as indicated at the output of the tube (as VG3 and VG4 can be adjusted) because each adjustment of either VG1 or VG2 effects the tube current and therefore the gain. This requirement is additional to the requirement of a calibrated collector current meter I to ensure that the tube is operating with at least approximately the correct gain.

The present invention seeks to overcome these difficulties and to provide an arrangement which is as easy to adjust in the field as is the arrangement of FIG. 1.

According to this invention an ultra low noise travelling wave tube arrangement comprises individual connections adapted for the supply of individually selected potentials to the cathode, the delay line, the collector and all but the first two grids of the tube (counting the grids from the cathode end of the tube): a further individual connection adapted for the supply of an individually selected potential to one of said first two grids; and a potentiometer the resistance of which is connected to receive potential from said further individual connection and the slider of which is connected to the other of said first two grids.

Preferably the said potentiometer is mounted outside the evacuated envelope of the tube but inside the normally provided protective capsule of the tube. In practice the slider of the potentiometer is pre-set in the factory test laboratory of the manufacturer to give the right value of potential on the grid to which it is connected when the potential applied to the aforesaid further individual connection is of such value as to result in the application to the first two grids of that combination of potentials which results, when the other electrode potentials are correct, in minimum noise figure. The potentiometer slider is, therefore, no longer an adjustment device to be used in the field but is a pre-set adjustment device, the potentiometer being enclosed in the tube protective capsule (so that its slider is not available for adjustment in the field) and being part of a pre-adjusted internally connected unit consisting of the encapsulated tube and potentiometer supplied by the manufacturer. With this arrangement subsequent adjustment in the field is done in the same way as that already described with reference to FIGURE 1, there is no need for an accurately calibrated voltmeter for the purpose of such adjustment in the field and, for this purpose, the only calibrated instrument required is the collector current meter.

Normally the voltage required by the second grid will be more positive than that required by the first. In this case the aforesaid further individual connection is taken to the second grid, the resistance of the potentiometer is connected between the second grid and the cathode of the tube and the slider of said potentiometer is connected to the first grid. If, however, in the case of any particular tube, the potential on the first grid is required to be more positive than that on the second, the aforesaid further individual connection is taken to the first grid, the resistance of the potentiometer is connected between the first grid and the cathode of the tube and the slider of the potentiometer is connected to the second grid.

FIG. 3 shows an embodiment of the invention for a case in which the required potential on the second grid is positive with respect to that required by the first. Comparing FIG. 3 with FIG. 2 it will be seen that the difference between the two figures is that, in FIG. 3, the potential for the first grid is derived from a potentiometer, here referenced VG11 the resistance of which is connected between the second grid and the tube cathode and the slider of which is connected to the first grid. This potentiometer is pre-set at the factory and, once pre-set, is encapsulated with the tube as conventionally indicated by the broken line rectangle X. Adjustment in the field is now confined to adjustment of the sliders VG2, VG3, VG4 and VH and is performed in the manner already described with reference to FIG. 1, requiring no calibrated voltmeter for such performance.

The potentiometer VG11 is mounted outside the evacuated envelope of the tube, which is indicated by the dashed line EE, but inside the normally provided protective capsule of the tube, which is indicated by the dashed line PC. As noted above, the slider of potentiometer VG11 is pre-set in the factory test laboratory of the manufacturer to give the right value of potential on the grid to which it is connected when the potential applying to the aforesaid further individual connection is of such value as to result in the application to the first two grids of that combination of potentials which results, when the other electrode potentials are correct, in minimum noise figure. The potentiometer slider is, therefore, no longer an adjustment device to be used in the field but is a pre-set adjustment device.

FIGURE 4 shows a modification of the travelling wave tube shown in FIGURE 3 in which the potential on the first grid is required to be more positive than that on the second. In this embodiment, the connections to potentiometer VG11 are reversed, with the slider being connected to the second grid G2 and the end of the potentiometer being connected to the first grid G1. With the exception of this reversal of contacts, the embodiment illustrated in FIG. 4 is the same as the embodiment in FIG. 3.

I claim:

1. An ultra low noise travelling wave tube comprising a cathode, a delay line, a collector, at least three grids spaced between said cathode and said collector, a potentiometer having two end terminals and a slider terminal movable between said two end terminals, the slider terminal of said potentiometer being coupled to one of the two grids closest to said cathode, one end terminal of said potentiometer being coupled to the other of said two grids closest to said cathode, means for applying an individually adjustable potential between the two end terminals of said potentiometer, and means for applying [individually adjustable] *individual* potentials to said collector, delay line, and the remaining grids of said travelling wave tube.

2. An ultra low noise travelling wave tube as defined in claim 1 wherein said cathode, delay line, collector, and grids are mounted within an evacuated envelope, said evacuated envelope being mounted within a protective capsule, and said potentiometer being mounted outside said evacuated envelope but within said protective capsule.

3. An ultra low noise travelling wave tube as defined in claim 1 wherein the slider terminal of said potentiometer is coupled to the grid closest to said cathode, said one end terminal of said potentiometer being coupled to the grid which is second closest to said cathode, the other end terminal of said potentiometer being coupled to said cathode, and said means for applying an individually adjustable potential between the two end terminals of said potentiometer being connected to apply a positive potential to said one end terminal of said potentiometer and to apply a negative potential to said other end terminal of said potentiometer.

4. An ultra low noise travelling wave tube as defined in claim 1 wherein said one end terminal of said potentiometer is coupled to the grid closest to said cathode, said slider terminal of said potentiometer being coupled to the grid which is second closest to said cathode, the other end terminal of said potentiometer being coupled to said cathode, and said means for applying an individually adjustable potential between the two end terminals of said potentiometer being connected to apply a positive potential to said one end terminal of said potentiometer and to apply a negative potential to said other end terminal of said potentiometer.

References Cited

The following references, cited by the Examiner, are of record in the patented file of this patent or the original patent.

UNITED STATES PATENTS

| | | | |
|---|---|---|---|
| 2,306,663 | 12/1942 | Schlesinger | 313—82.1 X |
| 2,351,757 | 6/1944 | Gray | 313—82.1 X |
| 2,414,881 | 1/1947 | Law | 313—82.1 X |
| 2,776,389 | 1/1957 | Peter | 315—3.5 X |

FOREIGN PATENTS

| | | |
|---|---|---|
| 110,604 | 5/1944 | Sweden. |

ELI LIEBERMAN, *Primary Examiner.*

S. CHATMON, JR., *Assistant Examiner.*